Nov. 18, 1969   B. PIEHL   3,479,043

GAS TRANSPORT APPARATUS

Filed June 19, 1968   3 Sheets-Sheet 1

INVENTOR.
BILL PIEHL
BY *Ely Silverman*
ATTORNEY

INVENTOR.
BILL PIEHL

Nov. 18, 1969　　　　B. PIEHL　　　　3,479,043
GAS TRANSPORT APPARATUS

Filed June 19, 1968　　　　　　　　　　3 Sheets-Sheet 3

BILL PIEHL
INVENTOR.

BY

Ely Silverman
ATTORNEY

United States Patent Office 3,479,043
Patented Nov. 18, 1969

3,479,043
GAS TRANSPORT APPARATUS
Bill Piehl, Amarillo, Tex., assignor of fifty percent to
Jack B. Kelley, Amarillo, Tex.
Filed June 19, 1968, Ser. No. 738,151
Int. Cl. B60p *3/22;* B61d *5/00*
U.S. Cl. 280—5
5 Claims

ABSTRACT OF THE DISCLOSURE

A tank transport trailer comprising a semi-flexible wheeled trailer frame with one upright support at its front and another at its rear, supporting a plurality of long thin tanks, each tank extending longitudinally of the trailer frame, one end of each tank relatively fixedly attached to and supported at one end of the frame and there attached to manifold piping, the other end of the tank rotates in another upright relatively flexibly supported on the frame, the tanks being spaced apart vertically and laterally whereby the stresses concomitant on road travel applied to such elongated containers used as carriers for gas at high pressure are minimized.

BACKGROUND OF THE INVENTION

The field of art to which this invention pertains is land vehicles specially adapted to tank transportation.

The prior art

Large diameter tanks are not feasible for high pressures of gas transport. Trailers for long tanks of small diameter, prior to this invention develop undesirable operating characteristics as well as structural failures. Notwithstanding the economic incentives for development of a safe reliable transport vehicle for high pressure gas, this has been a problem in the art for many years. Uneven tire loading and consequent inconvenience if not danger in transport and structural damage to the support vehicle result. U.S. Patents 2,071,330; 2,380,562 and 3,158,383 are typical structures used.

SUMMARY OF THE INVENTION

Notwithstanding the apparent sturdiness of high pressure gas containing structures, they are to be considered as rather delicate and subject to considerable vibration. By this invention the gas containers are supported to eliminate or reduce as much as possible the strains concomitant on stresses applied thereto.

This is accomplished by a trailer frame that is a semi-flexible structure, twistable about its longitudinal axis and bendable about its horizontal axis but rigid in regard to bending about a vertical axis, spacing apart of the containers to avoid the effects of any sudden movement of such rather long tubes during their travel and so avoid contact with each other and any strain thus transmitted from one to the other and each tank is supported relatively flexibly and rotatably to avoid consequence of the usual side to side twisting relations of the trailer frame during the travel thereof over usual roads; uneven tire loading and exceeding fatigue limits of these tubes and frame parts are thus avoided notwithstanding the manifolding of such tubes as is usual for commercial purposes.

DESCRIPTION OF THE PREFERRED EMBODIMENT

Figure 1:
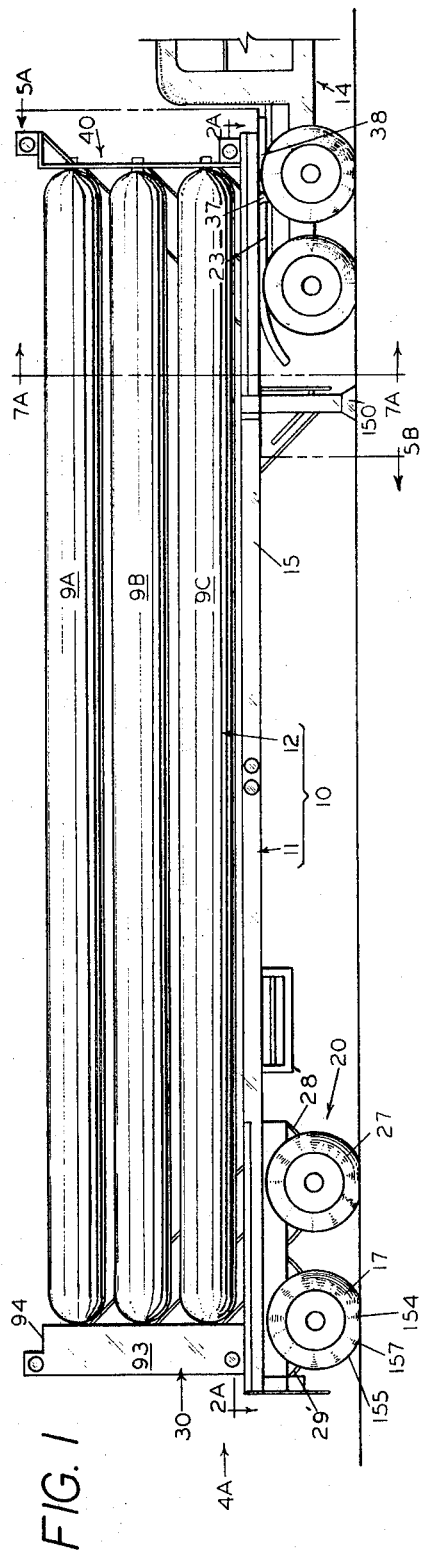
FIGURE 1 is a side view of the apparatus 10.
Figure 2:
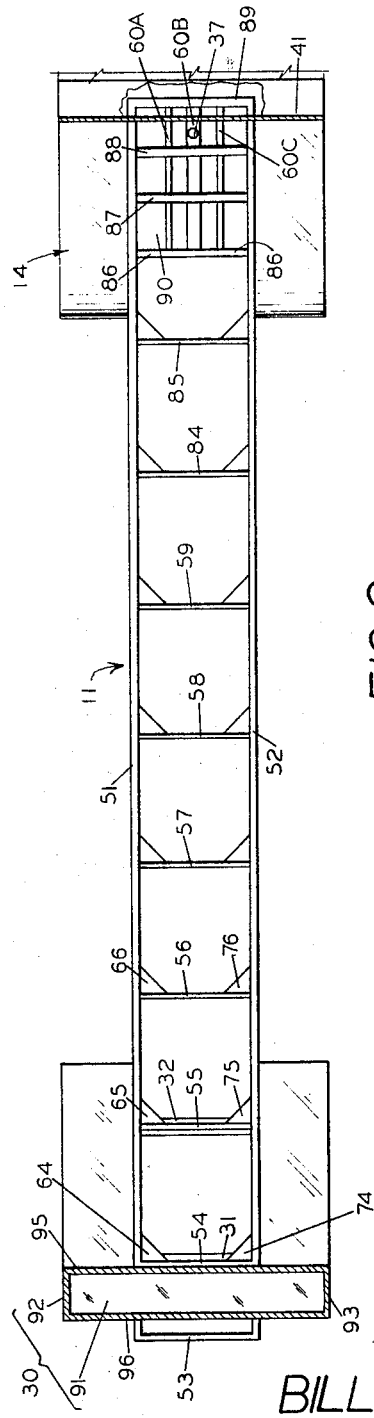
FIGURE 2 is a top view taken generally along the section 2A—2A of FIGURE 5, and broken away in part.

A preferred embodiment of apparatus 10 of this invention comprises a wheeled frame 11, supporting an array of high pressure containers 12. Referring to FIGURES 1 and 2, the apparatus 10 is drawn by a conventional tractor 14. The frame 11 comprises a flat frame bed 15, which is supported on a wheel and spring assembly 20, and supports rear upright support assembly 30 and front upright support assembly 40.

Frame bed 15 comprises a pair of longitudinally extending sturdy left and right side members 51 and 52 each firmly joined to a series of like rigid transverse frame bed members 53, 54, 55, 56, 57, 58, 59, 86, 87, 88 and 89, as well as a flat rectangular stiffener plate 90. Member 54 is the rear transverse frame bed member and member 89 is the front transverse frame bed member. A conventional support 150 is attached to bed 15.

Each of the members 53–59 and 84–89 are firmly joined at their ends to the interior sides of the longitudinal frame bed members 51 and 52. Gusset plates as 64 and 74 at the end of member 54, and gusset plates 65 and 75 on member 55, and gusset plates 66 and 76 on member 56 and like gusset plate members at the end of each of the other transverse frame bed members are attached to such frame members and also to the longitudinal side members 51 and 52 and serve to stiffen the relations of the transverse frame bed members relative to the longitudinal members. One, left, lateral edge of the plate 90 is firmly attached to member 61; its right lateral edge is firmly attached to member 52; the front end of plate 90 is firmly attached to member 89; its rear edge is firmly attached to member 86; its top surface of its center portion is firmly attached to members 60A–60C, 87 and 88.

Rear upright assembly 30 comprises a sturdy plate element 91, firmly joined to members 51, 52 and 54. Such plate element 91 also strengthens frame 15.

Longitudinally extending stiffening and strengthening members 60A, 60B and 60C are affixed at their bottom to plate 90 and at their ends to members 86, 87, 88 and 89 and provide further rigidity to the front end of the frame bed 15.

A sturdy fifth wheel pin 37 is located substantially under the front upright assembly 40. It is firmly attached to plate 90 and member 60B, close to members 88 and 89.

Bed frame 15 thus is resistant to bending around a vertical axis in a horizontal plane, but, with a length of some thirty feet, is bendable in the vertical plane, i.e. it is bendable about a horizontal axis transverse to the length of the frame 15; also, the front and rear ends of frame 15 may be twisted about a horizontal longitudinal axis extending parallel to and between members 51 and 52. Members 51–59 and 86–89 are straight and rigid and of uniform cross-section throughout.

The front upright assembly 40 comprises a steel plate 41, a transverse angle 42, a plurality of like nut and bolt sets 43A–43K, a plurality of like flanges as 45H, tie-rods as 46A, 46B and 46C.

Angle 42 is a rigid steel angle which has a greater transverse length than the transverse width of frame 15 measured transverse to the length of the frame 15. The width of the angle 42 is the same as the width of the plate 41. Angle 42 comprises a horizontal member 61 and a vertical member 62 firmly joined together. Member 61 is firmly affixed by welding to members 51 and 52 above the longitudinal location of pin 37.

The steel plate 41 of the upright assembly 40 has a uniform cross-section except where it is perforated as at each of the like holes 44A–44L for flanges therein. The plate 41 is supplied with a series of bolt holes and supported in an upright position firmly bolted through those bolt holes to the angle 42 by a series of like sets of nuts and bolts 43A–43J. Each of the sets 43A–43J is arrayed in an equispaced manner along a straight horizontal line on member 62; each set 43A–43K has a bolt, a nut and spring-like lock-washer; the entire plate 41 may pivot slightly about the horizontal line transverse to the frame bed 15, which line runs through the center line of the bolts 43A–43K, and the angle 42 has some degree of flexure between its members 61 and 62; nuts are 48, washers 49, bolts 47.

Figure 3:
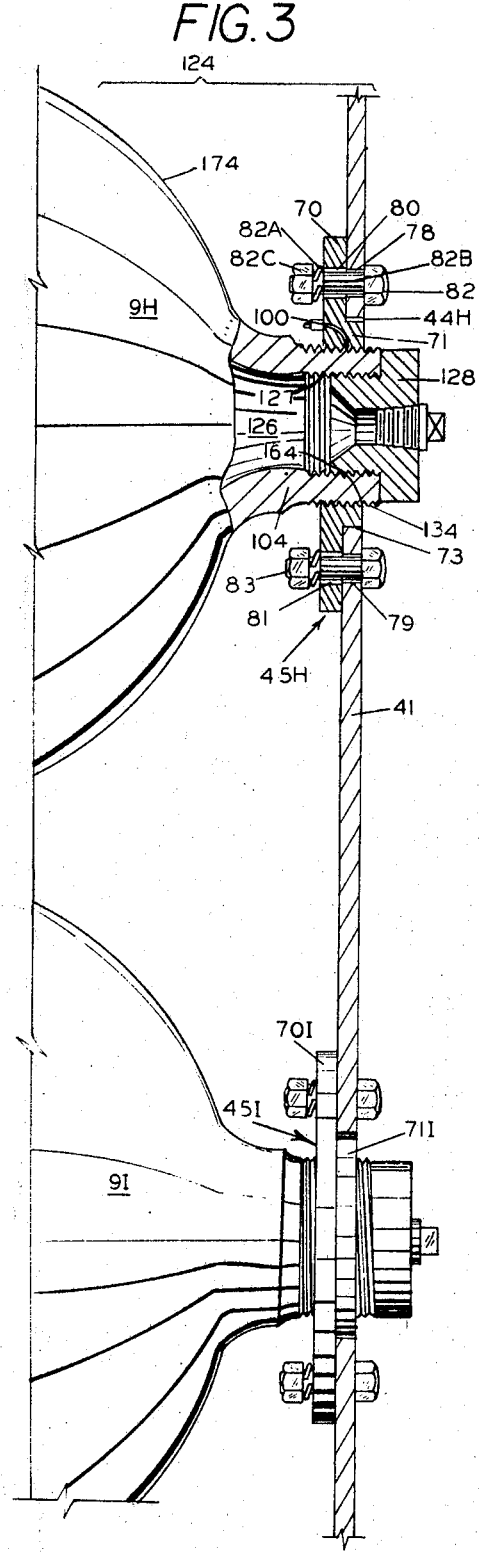
FIGURE 3 is an enlarged detailed view of zone 3A of FIGURE 6.
Figure 5:
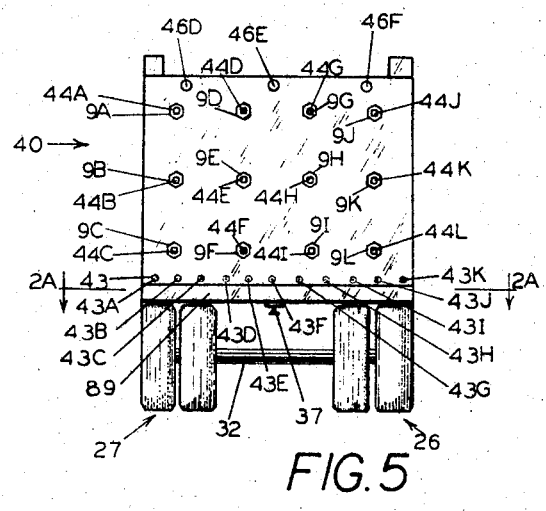
FIGURE 5 is a front end view along the longitudinally spaced apart transverse vertical planes 5A–5B of FIGURE 1.
Figure 6:
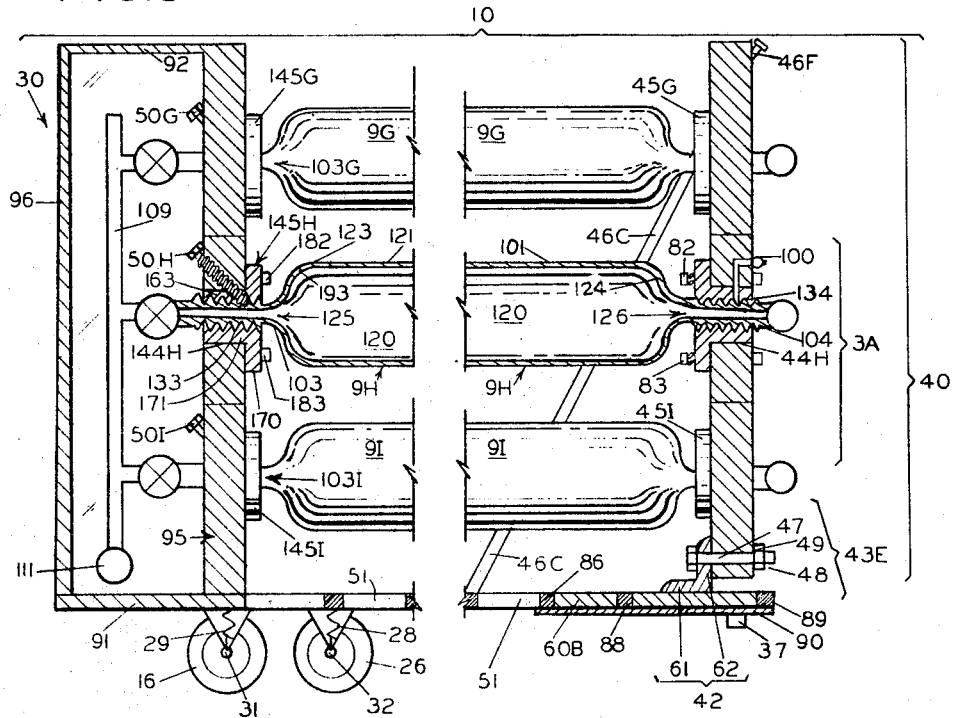
FIGURE 6 is a composite enlarged diagrammatic longitudinal sectional view of the ends of apparatus 10 as seen along the vertical section 6A–6B–6C of FIGURE 7.
Figure 7:
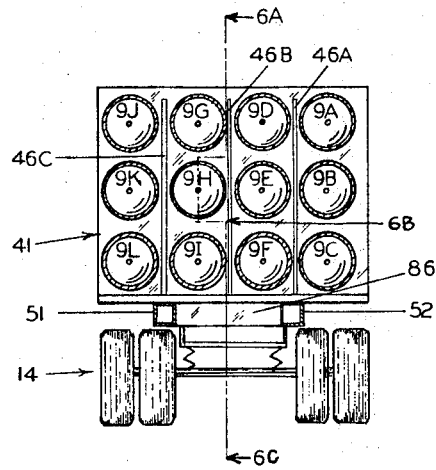
FIGURE 7 is a vertical transverse cross-sectional view along transverse vertical plane 7A—7A of FIGURE 1.
Particular dimensions and data on a preferred embodiment of this invention are given in the table.

Referring now to FIGURES 3, 5 and 6 the plate 41 has therein a plurality of like sized holes 44A–44L. Each of these holes 44A–44L provide for support of one of a plurality of like flanges such as flange 45H in hole 44H. Each of these holes 44A–44L are arrayed in one of a series of vertically spaced apart parallel horizontal lines i.e. holes 44A, 44D, 44G, and 44J are arrayed in one upper, straight horizontal line; holes 44B, 44E, 44H, and 44K are arrayed in another, intermediate, straight horizontal line vertically spaced from said upper line, and holes 44C, 44F, 44I and 44L are arrayed in another lowest straight line, vertically spaced below said intermediate line; the intermediate line is spaced apart an equal distance vertically from said lowest line and said upper line. This array permits flexing of plate 41 about a horizontal line such as that in which the rear ends of longitudinal axes of containers 9A, 9D, 9G, and 9J lie as well as the line of the bolts in sets 43A–43K. Holes 44A–44L are arrayed symmetrically about the longitudinal center plane of frame bed 15. Flange 45H fits into hole 44H of plate 41. Each flange, as 45H, in each of holes 44A through 45L are alike, hence the description of the flange 45H attached to tube 9H applies to all of the other flanges in the holes 44A–44L. Flange 45H comprises a wide circular shoulder portion 70, and, concentric therewith and firmly attached thereto a narrow cylindrical neck portion 71. A bearing surface 73 lies on the bottom of the cylindrical neck 71 lies in the concave surface of the hole, as 44H, therefor in the plate 41. Each of a group of four like bolts (82 and 83 are shown) for the flange 45H pass through a hole therefor, as 80 and 81 respectively, in the shoulder 70 of the flange 45H. Shaft 82B of bolt 82 and the other like shafts of the like bolts passing through the shoulder as 70 of that and like flanges is a ¾″ diameter shaft. The hole as 78 in the plate 41 for each shaft as 82B has a 25/32″ internal diameter; therefore, there is a clearance of about .030″. The hole 80 in the flange 70 has a 28/32″ internal diameter size so that there is a 0.10″ clearance for the bolt shaft at that point. Additionally the bearing surface as 73 on each flange as 45H has a loose fit, i.e. a fit of about .010″ in the hole as 44H into which it fits. This is a relatively free fit and permits a corresponding minor amount of longitudinal motion of flange 70 (on container 9H) in the hole therefor as 44H, resisted however by the friction of the flange 70 and by nut and bolt sets as 82 and 83.

Accordingly, longitudinal stress along the length of each of the containers as 9A–9L is borne by the nut and bolt sets as 82, the flanges, and by plate 41 while vertical support is provided by the concave surface of holes as 44H. A lock-washer on each bolt (as 82A on bolt 82) bears against the nut as 82C for each bolt; an initial longitudinal motion thereof of 0.05 inch is readily effected. As there is about 20 inches of flat ½ inch steel plate between adjacent flange neck portions, as neck portion 71 of flange 45H and neck portion 71I of flange 70I, there is an easy elastic bend distortion of plate 41 of ¼ (0.25) inch to accommodate for longitudinal movement of the containers as 9A–9L, all without transverse sway of the support 41 or any lubrication requirement. The outer threads as 134 on the front neck of each tube (as 104 on 9H) may rotate about the longitudinal axis of the tube in the threaded portion as 164 of its flange neck, as 71. A grease fitting, as 100, may be used to lubricate each threaded connection between tube neck and its flange neck, as 104 and 71, for each container in array 12.

The rear upright assembly 30 comprises a flat floor member plate 91, a left vertical wall 92, a right vertical wall 93, a roof 94, a front plate 95, a left door 96 and a right door 97, all operatively connected. Elements 91, 92, 93, 94, 95 and 96 are each formed of ½″ thick metal sheet and are firmly joined together at their edges. This forms, so far as location of the corners of this assembly are concerned, a firm and relatively unyielding structure.

Figure 4:
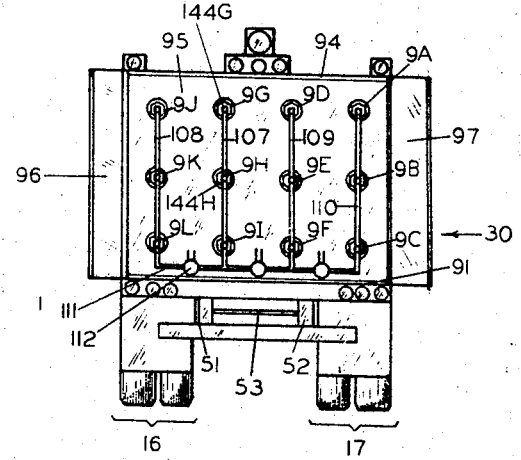
FIGURE 4 is a rear view of apparatus 10 along direction 4A of FIGURE 1.

The front of plate 95 is firmly joined by vertical gusset plates to the members 51 and 52 of the frame bed 15. Such gusset plates are imperforate triangular steel sheets with a vertical rear edge and horizontal bottom edge, the bottom edge of one of which is firmly fixed to member 51, the vertical rear edge is firmly fixed to the plate 95. Another like element is a triangular piece of rigid metal the bottom edge of which is firmly fixed to the element 52 and the vertical edge of which is firmly fixed to the plate 95. Accordingly, the upright assembly 30 is not only a relatively rigid and unyielding structure but also it is firmly fixed to the bed 15. The doors 96 and 97 are readily closed and protect the manifolding located therein. In FIGURE 4 the doors 96 and 97 are shown open to illustrate the manifolding while in FIGURES 1 and 2 the doors 96 and 97 are shown closed. Wall 95 is the same width, height and hole array as wall 41. Wall 95 is a mirror image of the wall 41, wall 95 is firmly fixed to elements 91–94 of the upright assembly 30 and is provided with holes therein identical in size and location to those provided in the wall 41. As shown in FIGURES 4 and 6 wall 95 is provided with holes therein 144G, 144H, and 144I corresponding respectively to the holes 44G, 44H and 44I in plate 41. Flanges in plate 95 as the flanges 145G, 145H and 145I are provided for the rear end of each of the containers as 9G, 9H and 9I and fit thereon in the same manner as do the corresponding flanges 45G, 45H and 45I in plate 41. Plate 41 differs in structure from plate 95 by the provision of the locking bolts as 50H, 50G and 50I provided through plate 95. Each of these bolts extend through holes therefor in the plate 95 and extend through the respective flanges and into the adjacent container neck portion, as 103, and serve to lock each container, as 9H, against rotation about its longitudinal axis and relative to the plate 95.

The array of high pressure containers 12 comprises a group of like gas-tight rigid containers 9A, 9B, 9C, 9D, 9E, 9F, 9G, 9H, 9I, 9J, 9K and 9L. One rear end, 123, of each of such containers as 9H is supported on a flange such as 145H located in a hole as 144H in the plate 95, while the other, front end as 124 is located in a flange as 45H located in the hole as 44H therefor in the plate 41. Each of containers 9A–9L is self-supporting and rigid from plate 95 to plate 41; these tubes are made to withstand a certain minimum amount of external pressure and are made as light as possible in view of the load required thereof. Additionally, by the reason of the structure provided by this invention, because the fatigue stress is minimized, the weight of material required is somewhat less than would otherwise be necessitated, for construction of these containers. Each of containers 9A–9L are formed of stainless steel seamless tubes, other data thereon are given in the table; for a 34 ft. length, the weight of the vessel would be about 4000 lb. with .04–.5 inch minimum wall thickness. The forward and rear ends are mirror images of each other, the only difference being in the locking of each of the rear necks as 103G, 103 and 103I by the bolts as 50C, 50H, or 50I therefor so that the manifolding within the assembly 30 may be permanently effected. The rear ends as 103G, 103 and 103I of the tubes 9G, 9H and 9I are connected to manifold elements as 107, 108, 109 and 110 which are in turn connected to other manifold elements as 111 and valves as 112 for discharge of any one or group of the containers 9A–9L.

Tie rods 46A, 46B, and 46C each extend diagonally downward and rearward from plate 41 to frame bed 15. They are attached to plate 41 above the top of top row of tubes as 9A, 9D, 9G and 9J; these tie rods prevent excessive pivoting of plate 41 in a clockwise direction about the line of angle 42. They are loose and, referring to FIGURE 6, permit pivoting of plate 41 for 3/16 inch without strain on such tie rods, following which the tie rods absorb any longitudinal force of the forwardly (right as shown in FIGURES 1 and 6) moved array 12, or portion thereof.

Assembly 20 comprises rear left wheels 16, rear right wheels 17, front left wheels 26, front right wheels 27, front axle 32, rear axle 31 and left front springs 28, left rear springs 29, right front springs 28' and right rear springs 29'. Springs as 29 and 28 are attached firmly at their top to the bed 15 and are firmly affixed to axles 31 and 32 respectively, which axles are supported by the ground contacting wheels therefor as (26 and 16); the springs as 29' and 28' are attached to the frame and, via axles 31 and 32 support the corresponding right wheels 17 and 27. Pin 37 is pivotally connected to and supported on the fifth wheel 38 of a conventional tractor 14. Assembly 20 is attached to frame 15 forward of the forward attachment of assembly 30 to bed 15, the rear axles 31 being under plate 95.

Assembly 12 comprises a group of like elongated gas containers 9A, 9B, 9C, 9D, 9E, 9F, 9G, 9H, 9I, 9J, 9K and 9L. All the containers of the assembly, as 9H, are alike and the description of container 9H applies to all such like containers in the assembly 12. Each container, as 9H, is composed of a center cylindrical body portion 101 of uniform cross-section with a narrow front end, 124, and a narrow rear end 123; front end 124 is attached to the front of portion 101 and includes a smoothly curved transition portion 174 and a narrow neck 104 with external threads 134, the rear of the transition portion being joined to the front end of the body portion 101, and the front of that transition portion joined to the neck 104.

Rear end 123 is similar in size and shape to end 124; it is attached to the rear of cylindrical body portion 101 and includes a smoothly curved transition portion 173 joined to the rear end of the body portion 101 and a narrow cylindrical rear neck 103 with external threads 133. Necks 103 and 104 are of smaller diameter than body 101 and are of the same size. The cylindrical body 101 consists essentially of a straight seamless tube section with a thin gas-tight metal wall 121 of uniform cylindrical cross-section and thickness enclosing an interior straight cylindrical chamber 120; a curved and narrow front exit orifice 126 extends from chamber 120 through the longitudinal or axial center of neck 104; similarly curved and narrow rear exit orifice 125 extends from chamber 120 through neck 103; the interior surface of neck 104 has an interior thread 127 adjacent orifice 126 and a removable plug 128 is located in such threads and forms a gas-tight fit therein and closes off the orifice 125 from the exterior of chamber 120 to the front of the interior chamber 120. The external threads as 134 on each container, as 9H, in assembly 12 are firmly yet rotatably held in the matching internal threads 164 of the neck portion 71 of the flange therefor, as 45H, in the plate 41. Each tank as 9H forms a gas-tight container for transport of gas at high pressure, e.g. 2,000 to 4,000 p.s.i. gauge pressure.

The external thread as 133 on the rear neck as 103 of each container, as 9H, in assembly 12 are firmly held in the matching internally threaded portion, as 163, of the neck, as 171, of the flange, as 145H, in plate 95.

For each container, as 9H, a stiff rod or bolt as 50H is firmly attached, as by threading, to the plate 95 and extends through each rear flange neck (171) therefor into the top of the rear neck portion, as 103, of such container, as 9H. Each such bolt as 50H does not extend into the chamber, as 120 or 125, of any container, as 9H; each bolt, as bolt 50H, forms a firm fit in plate 95, its flange neck as 171, and its container neck as 103; it prevents rotation of the neck as 103 with respect to the flange, as 145H, therefor; four like bolts on each flange plate (as 182 and 183 shown on 170) are firmly attached to each flange plate as 170 and plate 95 and prevent movement and rotation of such flange as 145H with respect to plate 95. The rear ends of each of the like containers, 9A–9L, and their attachments to plate 95 (flanges, threads, bolts etc.) correspond to those structures described for end 103 of container 9H. The bolts 182 and 183 correspond to the bolts 82 and 83 in flange 45H. There are four bolts such as 182 and 183, equally and symmetrically spaced about the center of each rear neck as 103. The body portion, as 101, the front neck as 104, the rear neck as 103, and orifices as 125 and 126 and the interior chamber, as 120 of the container 9H are co-axial as they are for each of the containers 9A–9L.

The containers 9A–9L are supported in plates 41 and 95 with the distances between longitudinal centers of adjacent containers (such distances measured transversely to the length of such containers and hence transverse to the length of frame 15), being clearly greater than the diameters of such containers; thereby those containers are supported on plates 41 and 95 in apparatus 11 without direct physical contact between those containers. The distance between neighboring exterior surfaces of neighboring containers, as 9H and 9J, is at least one inch, and preferably 2 inches in the embodiment referred to in the table; this spacing avoids any contact between containers due to short periods of intense vibration of the apparatus 10 and also permits ready inspection and handling of the containers while in the assembly and during the assembly or dis-assembly of such apparatus. Further, accumulation of debris as may cause scratching of the walls of the containers is avoided by such spacing; and such spacing permits ready cleansing from and removal of road dirt by simple hosing of apparatus 10 with water.

By the structure above described, as frame 15 is rigid relative to motion in the horizontal plane, and as it is fixed to plate 41 and as plate 41 is rigid in the vertical plane, lateral motion of the front or rear end of any of the tanks 9A–9L relative to the frame bed 15 is proscribed. Accordingly, any change of momentum during the travel of the apparatus 10 does not build up any substantial movement to either side of any of the containers 9A–9L. However, because the plate 41 is relatively flexible there is no restraint thereby of containers 9A–9L as might cause development of S-curves therein on upward motion of assembly 30 relative to assembly 40 during travel of the apparatus 10 along direction of length of frame 15.

The pivotal attachment of each of the containers 9A–9L in their flanges such as 70 permits, for instance, the rear wheels 16 and 26 to quickly drop and yet there be maintained an even distribution of weight on all the wheels of the trailer 10 and tractor 14 and so maintain safe connection with the road, notwithstanding the usual bumps that occur as well as vibration due to road surface irregularities. The flexibility of the plate 41 and the rotatability of each of the tubes 9A–9L therein of apparatus 10 permits ready rotation of the assembly 30 relative to the tractor 14 and fifth wheel 38: this accommodates for irregularities in the road and thus maintains an even distribution of the weight of assembly 12 and of the trailer on the wheels of the trailer and so provide safety and control of apparatus 10 during its transport over the road by the tractor 14.

The variation between the maximum tire diameter 155 and the minimum tire diameter as 154 of tire 17 where the footprint 157 of the tire is formed on usual road travel of the apparatus 10 (plus various standing waves) create repeated vertical vibrations of assembly 30 relative to pin 37 in operation of apparatus 10 of this invention; these are absorbed by the continual flexing of frame bed 15 and plate 41, thereby absorbing the vibrations that might otherwise require to be absorbed by bending of containers 9A–9L.

Containers 9A–9L are relatively rigid and firmly fixed at the assembly 30 but are still being allowed some pivotal motion at the plate 95 about a horizontal axis. As shown in FIGURE 3, which is substantially to scale, the portion of the plate 41 between any vertically or horizontally adjacent tubes as 9H and 9I is relatively thin; this flexibility permits the twisting above discussed to accommodate to road irregularities without added strain on tubes 9A–9L at the same time adequate vertical support for the elements 9A–9L is provided. This vertical support is provided not only by the compressive strength of the plate 41 but also by the location and attachment of the other rear end of each of the tubes as 9A–9L in the plate 95 of the rear upright assembly 30 and the limitation of any forward travel of the plate 41 by the tie rods as 46A, 46B, 46C and 46D.

In the overall the apparatus of this invention thus provides for a fairly rigid support for an array of gas containing tubes directly above a rear wheel assembly as 20, that rear wheel support being firmly connected to one, rear, end of a flat frame that is twistable and flexible about a longitudinal horizontal axis and flexible about a horizontal axis transverse to its length, the other end of that frame firmly attached to and supporting a vertical plate 41 allowing some pivotal motion about a horizontal axis transverse to the longitudinal axis or length of the frame and allowing some twisting of that plate.

The upright assembly 40 is sufficiently flexible to accommodate the longitudinal motion and rotation of the containers of assembly 12 and twisting of frame 15 during usual operation of the assembly 10 with a minimum number of moving parts because plate 41 permits, repeatedly, the motions that are required, concomitant with adequate support of the containers 9A–9L. Plate 41 is a low-alloy, high yield strength steel with a yield strength of 100,000 p.s.i., tensile strength of 115–135,000 p.s.i. and a chemical composition described in U.S. Patent 2,586,042.

TABLE

Assembly 10:
  Weight (empty) _____ 37,000 lb.
  Length _____ 37 ft.
  Width (overall) _____ 8 ft.
  Height (overall) _____ 11 ft. 6 in.
Frame 15 ($T_1$ Steel):
  Width (interior) between 51 and
    52 _____ 40 in.
  Structure of members as 51–59
    and 84–89 _____ 4 in. x 6 in. box.
  Gusset plate as 74 _____ ¼ in. x 5 in.
  Plate 90 _____ ¼ in. plate.
  Pin 37 _____ 2 in. dia.
Assembly 12 (each of tubes 9A–9L):
  Outside diameter, 121 _____ 22 in.
  Wall thickness, 121 _____ 0.431 in.
  Outside diameter, neck 104 ____ 4½ in.
  Wall thickness at 174 _____ 1⅛ in.
  Length, end 104 to end 103 ____ 34 ft. 4 in.
  Weight (empty) _____ 3,900 lb.
  Mechanical properties of steel
    (AISI 4147 alloy steel)—
      Ultimate tensile strength    130,000 min.;
                                   155,000 max.
      Elongation (2 in.) _____ 12% in area—40%.
  Threads, 134—
    Minimum length _____ 2⅛ in.
    Major diameter _____ 4.4972 in.
    Pitch diameter _____ 4.4160 in.
    Minor diameter _____ 4.3438 in.
  126, diameter at 104 _____ 3⅛ in.
  Distance between adjacent tubes _ 1 in. min.
Assembly 30:
  Plate 95—
    Thickness _____ ⅜ in.
    Width _____ 82 in.
    Height _____ 6 ft.
  92, length _____ 11 in.
  Bolt 50
    Length _____ 4 in.
    Diameter _____ ¼ in.
Assembly 20:
  Tire size _____ 100 x 22.
  Tire—radius to footprint area _ 21 in.
  Tire—maximum radius _____ 22 in.
Assembly 40:
  Angle 42 _____ 4″ x 4″ x ⅜″.
  Bolts 43A–43J _____ ¾ in. dia.
  Flange 70, diameter x thickness _ 11 in. x ¾ in.
  Neck 71, diameter x thickness __ 6 ins. x ½ in.
  Bolt 82, diameter _____ ¾ in.
  Hole 80, diameter in flange 70 _ 28/32 in.
  Hole 78, diameter in plate 41 __ 25/32 in.
  Tie-rod 46—
    Length _____ 9 ft.
    Diameter _____ ⅞ in.
    Free play _____ ⅛ in.–9/16 in.
  Plate 41—
    Height _____ 72 in.
    Width _____ 82 in.
    Thickness _____ ½ in.
  Material—$T_1$ Steel.[1]
Composition (see U.S. Patent 2,586,042):

C _____ 0.10/0.20%.
  Mn _____ 0.60/1.00%.
  Si _____ 0.15/0.35%.
  Ni _____ 0.70/1.00%.
  Cr _____ 0.40/0.65%.
  Mo _____ 0.40/0.60%.
  V _____ 0.03/0.80%.
  Cu _____ 0.15/0.50%.
  B _____ 0.002/0.006%.
  $P_{max.}$ _____ 0.035%.
  $S_{max.}$ _____ 0.040%.
Mechanical properties:
  Yield strength _____ 100,000 p.s.i.
  Tensile strength _____ 115/135,000 p.s.i.
  Elongation in 2 inches, minimum_ 18%.
  Reduction in area, minimum ___ 40%.
Impact value, minimum:
  Charpy, V-notch longitudinal at—
    0° F. _____ 30 ft. lb.
    −50° F. _____ 20 ft. lb.
  Transverse at 0° F. _____ 20 ft. lb.

[1] $T_1$ Steel—High yield strength weldable steel (trademark U.S. Steel Co.).

I claim:

1. A tank transport trailer comprising a wheeled trailer frame with one upright support at its front and another at its rear, a plurality of long thin containers, each container being a cylindrical tank extending longitudinally of the trailer frame, one end of each tank relatively fixedly attached to one upright support at one end of the frame and there operatively attached to manifold piping, the other end of each tank rotatably supported for rotation about the longitudinal axis of said tank in another upright support attached to and relatively flexibly supported on the frame for movement longitudinally of the frame, all the tanks being spaced apart vertically and laterally, said trailer frame being a semi-flexible structure, twistable about its longitudinal axis and bendable about a horizontal axis transverse to the length of the frame but rigid in regard to bending about a vertical axis.

2. Apparatus as in claim 1 wherein the said upright support relatively flexibly attached to the frame is a flexible plate pivotally yet permanently attached near its bottom to said frame.

3. Apparatus as in claim 2 wherein said upright support relatively flexibly attached to the frame comprises a vertical tough flexible steel plate with an array of longitudinally movable tank support means therein, one of each of said tank support means in said array for one of each of said plurality of tanks, one end of each of said tanks supported on one of said tank support means, and pivotal support means in each of said tank support means pivotally attached to the said one end of said tank supported thereon.

4. Apparatus as in claim 3 wherein the flexible plate in the upright support means is pivotally yet permanently attached near its bottom to the frame and a relatively non-extensible rod is attached at one end to the frame between the one upright support and the bottom of said flexible plate and is operatively connected to said flexible plate to restrain the pivoting of said flexible plate after a predetermined amount of pivoting of said flexible plate about a horizontal axis in a direction away from said one upright support means.

5. Apparatus as in claim 4 wherein a wheeled support is attached to said frame below said one upright support means and a fifth wheel attachment is attached to said frame below said other upright support means.

References Cited

UNITED STATES PATENTS

| | | | |
|---|---|---|---|
| 2,024,411 | 12/1935 | Willoughby | 105—360 |
| 2,071,330 | 2/1937 | Buchholz | 280—5 |
| 2,087,300 | 7/1937 | Ragonnet | 280—5 |
| 2,380,562 | 7/1945 | Watson | 280—5 |
| 2,412,146 | 12/1946 | Hansen | 280—5 |
| 2,761,397 | 9/1956 | Holst | 105—360 |
| 3,158,383 | 11/1964 | Anderson | 280—5 |

LEO FRIAGLIA, Primary Examiner

U.S. Cl. X.R.

105—360